United States Patent [19]
Liwak et al.

[11] Patent Number: 5,164,434
[45] Date of Patent: Nov. 17, 1992

[54] THERMAL STABILIZERS

[75] Inventors: Susan M. Liwak, Langhorne; Nazir A. Memon, Yardley, both of Pa.

[73] Assignee: Rohm and Haas Company, Philadelphia, Pa.

[21] Appl. No.: 621,173

[22] Filed: Nov. 30, 1990

[51] Int. Cl.$^5$ .......................... C08K 5/34; C08K 5/36; C08K 5/13
[52] U.S. Cl. .................................. 524/100; 524/305; 524/350; 524/392; 252/406; 252/407
[58] Field of Search ............... 524/100, 350, 392, 305; 252/406, 407

[56] References Cited

U.S. PATENT DOCUMENTS

| | | | |
|---|---|---|---|
| 3,218,292 | 11/1965 | Horne | 524/350 |
| 3,658,743 | 4/1972 | Bevilacqua | 524/350 |
| 3,721,704 | 3/1973 | Dexter | 524/287 |
| 4,670,493 | 6/1987 | Van Asbroeck et al. | 524/392 |
| 4,963,607 | 10/1990 | Reilly et al. | 524/392 |

FOREIGN PATENT DOCUMENTS

| | | |
|---|---|---|
| 1218778 | 3/1987 | Canada . |
| 264931 | 2/1989 | Fed. Rep. of Germany . |

*Primary Examiner*—Kriellion S. Morgan
*Attorney, Agent, or Firm*—Darryl P. Frickey; Roger K. Graham; Richard A. Haggard

[57] ABSTRACT

The invention is directed to stabilizer compositions, to polymers containing three stabilizer compositions for use as additives in polymers, and to polymeric products which contain these additives. The stabilizer compositions comprise a compositon of: a) at least two hindered phenols and b) a sulfide. These compositions are admixed with polymers to provide polymeric additives to improve the physical and mechanical properties of polymers matrices.

20 Claims, No Drawings

THERMAL STABILIZERS

FIELD OF THE INVENTION

This invention relates to stabilizer compositions, stabilized polymeric additives and products which include these stabilized polymeric additives. The invention particularly relates to stabilizer compositions for butadiene copolymers, acrylic and methacrylic copolymers, and to polymeric products which include these stabilized copolymers.

BACKGROUND OF THE INVENTION

Polymers such as those prepared from methacrylate-butadiene-styrene ("MBS") monomers and polymers predominantly based on acrylic and methacrylic- "(meth)acrylic"- esters monomers, are routinely employed as additives in polymeric matrices to provide products with improved impact properties. MBS polymers, however, are prone to thermal and oxidative degradation at elevated temperatures. (Meth)acrylic polymers, herein termed acrylic impact modifiers ("AIMS"), are prone to thermal and oxidative degradation, although to a lesser degree than MBS polymers. This tendency of MBS and AIMS polymers to degrade at elevated temperatures reduces the ability of these polymers to impart improved impact strength in polymer matrices of acrylics, polyamides, and other engineering resins, as well as in blends which require relatively high processing temperatures.

MBS and AIMS polymers employed as additives in polymeric matrices are routinely treated with stabilizers to protect them against thermal and oxidative degradation. However, these stabilizers may cause polymers to lose impact strength and develop colored impurities in the polymer matrix as a byproduct of their antioxidant action.

A need therefore exists to improve stabilizers for polymers such as MBS and AIMS and to improve polymeric products that employ the polymers which incorporate these improved stabilizers.

SUMMARY OF THE INVENTION

The invention is directed to stabilizer compositions, stabilized polymeric additives, and to polymeric products which contain these additives. These stabilized compositions improve the physical and mechanical properties of polymeric matrices.

The stabilizer compositions of the invention can be employed with a variety of polymers such as MBS, acrylate-butadiene-styrene, acrylonitrile-butadiene-styrene, styrene-butadiene-styrene, styrene-butadiene-styrene block copolymers, styrene-isoprene-styrene block copolymers, MBS and AIMS copolymers, AIMS polymers, for example core-shell polymers in which the core and shells predominantly contain (meth)acrylic polymers or copolymers, and the like to provide polymeric additives which show surprising improvement in thermal degradation and oxidation resistance. The stabilizers of this invention comprise: 1) a sulfide having one or more of the following sulfide groups:

$$-CH_2-S-CH_2-R$$

wherein R is a lower alkyl of from 1 to 20 carbon atoms or an alkyl alkanoate, of the formula:

and n is an integer from 0 to 2; or 2,4-bis(n-octylthiol)-6-(4'-hydroxy-3',5'-di-tert-butylanilino)-1,3,5-triazine, and 2) a sterically hindered phenol containing one or more sterically hindered phenol groups having the formula (I):

wherein $R_1$ is a branched chain alkyl, and 3) a less sterically hindered phenol containing one or more sterically hindered phenol groups having the formula (II):

wherein $R_3$ is hydrogen or lower alkyl and $R_4$ is branched chain alkyl. The line through the phenol groups (i.e. "—") of formulas (I) and (II) indicates that another radical is attached to the benzene ring.

The preferred stabilizer composition comprises: 1) an alkyl sulfide having one or more of the following sulfide groups:

$$-CH_2-S-CH_2-R$$

wherein R is lower alkyl of from 7 to 11 carbon atoms, and 2) a sterically hindered phenol of the formula (III):

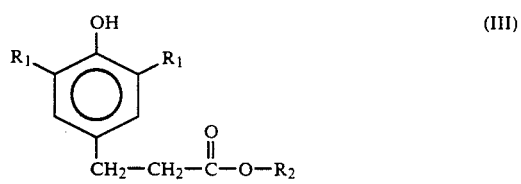

wherein $R_1$ is a branched chain alkyl, and $R_2$ is an alkyl of at least four carbon atoms, and 3) a less sterically hindered phenol of the formula (IV):

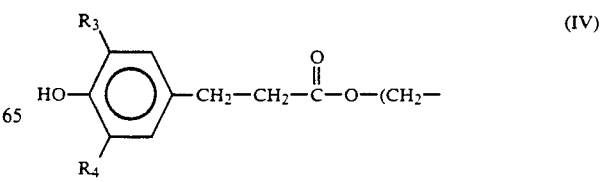

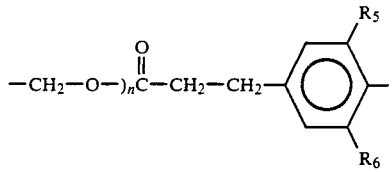

wherein n is an integer from 1 to 10; $R_3$ and $R_5$ are hydrogen or lower alkyl; and $R_4$ and $R_6$ are branched chain alkyl.

The stabilizers of the invention can be incorporated into polymers to make polymeric additives. These polymeric additives can be employed in polymer matrices to provide polymeric products having improved physical and mechanical properties. The polymeric products may be produced by admixing the additive into a polymer matrix, and then molding the polymer matrix to provide an improved polymeric product.

DETAILED DESCRIPTION OF THE INVENTION

The stabilizers of the invention comprise a ternary system of two hindered phenols, and an alkyl sulfide. The stabilizers comprise: 1) one or more sterically hindered phenols, such as a 3,5 disubstituted phenol having two tertiary branched chain alkyl groups, 2) one or more less sterically hindered phenols such as a 3,5 disubstituted phenol having a tertiary branched chain alkyl group, and a hydrogen, methyl, or lower alkyl group, and 3) a sulfide. The sterically hindered phenol comprises from about 5 to 40% of the stabilizer, and preferably from about 8 to 33%, the less sterically hindered phenol comprises from about 10 to about 70% of the stabilizer, and preferably from about 15 to 33%, and the sulfide comprises from about 15 to about 80% of the stabilizer, and preferably from about 33 to 73%.

The sterically hindered phenols of this invention have one or more groups of the following formula (I):

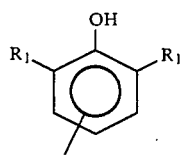

where $R_1$ is a branched chain alkyl, especially a branched chain lower alkyl of from 4 to 12 carbon atoms such as tert-butyl; 2,2-dimethylpropyl; 1-methylpropyl; sec-propyl; 1,2,2-tri-methylpropyl; 2-methylpropyl, 1,2-dimethyl-2-ethylbutyl, and the like. These phenols are exemplified by compositions such as octadecyl 3,5-di-tert-butyl-4-hydroxyhydrocinnamate, 2,2-bis [[3-[3,5-bis(1,1-dimethylethyl)-4-hydroxyphenyl]-1-oxopropoxy] methyl]-1,3-propanediyl 3,5-bis (1,1-dimethylethyl)-4-hydroxybenzenepropanoate, 1,3,5-tris (4'-hydroxy-3',5'-di-t-butyl benzyl)-1,3,5-triazine-2,4,6-(1H, 3H, 5H) trione, 3,5-di-tert-butyl-4-hydroxyhydrocinnamic acid triester with 1,3,5-tris (2-hydroxyethyl-5-triazine-2,4,6, (1H, 3H, 5H)-trione, 2,2-bis[4-(2-(3,5-di-t-butyl-4-hydroxy cinnamoyloxy)) ethoxy phenyl] propane, hexamethylene bis (3,5-di-tert-butyl-4-hydroxy hydrocinnamate), thiodiethylene bis-(3,5-di-tert-butyl-4-hydroxy hydrocinnamate, N,N' hexamethylene bis (3,5-di-tert-butyl-4-hydroxy hydrocinnanamide, 1,3,5-trimethyl-2,4,6-tris (3,5-di-tert-butyl-4-hydroxybenzyl) benzene and the like. Such phenols may be manufactured by methods known in the art such as, for example, by acid- or metal-catalyzed alkylation, or thermal alkylation, of the respective phenols, as is shown in *Encyclopedia of Chemical Technology*, Kirk-Othmer, Vol. 2, 3rd Ed., pages 65–66.

The less sterically hindered phenols of this invention have one or more groups of the following formula (II):

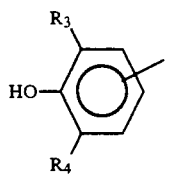

where $R_4$ is branched chain alkyl (as previously defined above for $R_1$), and $R_3$ is hydrogen or straight chain lower alkyl, of from 1 to 4 carbon atoms. These phenols are exemplified by compositions such as ethylene bis-(oxyethylene) bis(3-tert-butyl-4-hydroxy-5-methylhydrocinnamate), 2,2'-methylene bis (4-methyl-6-t-butyl phenol), octadecyl 3-methyl, 5-t-butyl-4- hydroxy hydrocinnamate, 4,4'-thiobis-(6-tertiarybutyl-o-cresol). Such phenols may be manufactured by methods well known in the art, such as acid- or metal-catalyzed alkylation, or thermal alkylation, and the like, as is shown in *Encyclopedia of Chemical Technology*, Kirk-Othmer, Vol. 2, 3rd Ed., pages 65–66.

The sulfides of this invention are preferably alkyl sulfides having one or more of the following sulfide groups:

$$-CH_2-S-CH_2-R$$

wherein R is alkyl, for example, lower alkyl of from 1 to 20 carbon atoms, and, preferably, 7 to 11 carbon atoms; or an alkyl alkanoate of the formula:

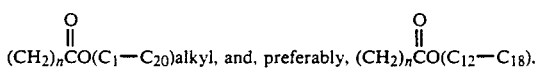

and n is an integer from 0 to 2; or 2,4-bis(n-octylthiol)-6-(4'-hydroxy-3',5'-di-tert-butylanilino)-1,3,5-triazine.

Alkyl includes lower alkyls of from 1 to 20 carbon atoms (i.e. $C_1$–$C_{20}$), such as methyl, ethyl, propyl, butyl, pentyl, hexyl, octyl, nonyl, decyl, undecyl, pentadecyl, icosyl, and the like; and branched chain alkyls of from 3 to 20 carbon atoms (i.e. $C_3$–$C_{20}$), such as such tert-butyl, 2,2-dimethylpropyl, 1-methylpropyl, sec-propyl, 1,2,2-tri-methylpropyl, 2-methylpropyl, 1,2-dimethyl-2-ethylbutyl, and the like. Examples of sulfides include, but are not limited to dilaurylthiodipropionate, pentaerythritol tetrakis (octyl thiopropionate), distearyl thiodipropionate, dimyristyl thiodipropionate, pentaerythritol tetrakis (β2,4-bis (n-octylthio)-6-(4'-hydroxy-3',5'-di-tert-butylanilino)-1,3,5-triazine, trimethylolpropanetris(octylthiopropionate), trimethylolethane tris(octylthiopropionate), ethylene glycol bis (laurylthiopropionate), and didodecylmonosulfide, and the like.

A surfactant may be included with the stabilizer to provide an emulsion of the stabilizer. Examples of surfactants suitable for use with the stabilizers of the invention are those which are thermally stable over 200° C.–350° C. Most preferably, sodium dodecylbenzene sulfonate is employed as the surfactant. The amount of surfactant typically constitutes 5 to 25% (by weight) of the stabilizer emulsion depending on the specific properties of the surfactant.

Another embodiment of this invention includes sterically hindered phenols having the following formula (III):

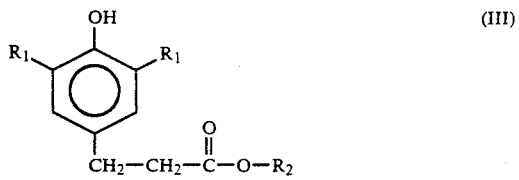

where $R_1$ is a branched chain alkyl, especially a branched chain lower alkyl of from 4 to 12 carbon atoms such as tert-butyl; 2,2-dimethylpropyl; 1-methylpropyl; sec-propyl; 1,2,2-tri-methylpropyl; 2-methylpropyl, 1,2-dimethyl-2-ethylbutyl and the like, and $R_2$ is alkyl of at least four carbon atoms, for example, $C_4$-$C_{30}$ alkyl such as butyl, pentyl, hexyl, heptyl, octyl, nonyl, decyl, icosyl, triacontyl and the like, and preferably $C_{16}$-$C_{20}$ alkyls. These phenols are exemplified by octadecyl 3,5-di-tert-butyl-4-hydroxyhydrocinnamate. Such phenols may be manufactured by methods known in the art such as, for example, by acid- or metal-catalyzed alkylation, or thermal alkylation, of the respective phenols, as is shown in *Encyclopedia of Chemical Technology*, Kirk-Othmer, Vol. 2, 3rd Ed., pages 65–66.

The less sterically hindered phenols of this invention have the following formula (IV):

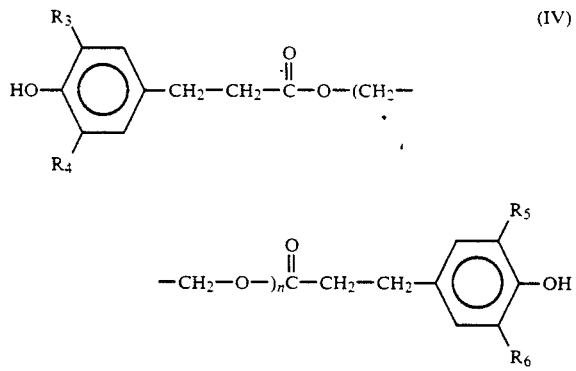

where $R_4$ and $R_6$ are branched chain alkyl (as previously defined above for $R_1$), and $R_3$ and $R_5$ are hydrogen or lower alkyl, of from 1 to 4 carbon atoms. These phenols are exemplified by ethylene bis(oxyethylene) bis(3-tert-butyl-4-hydroxy-5-methylhydrocinnamate). Such phenols may be manufactured by methods well known in the art, such as acid- or metal-catalyzed alkylation, or thermal alkylation, and the like, as is shown in *Encyclopedia of Chemical Technology*, Kirk-Othmer, Vol. 2, 3rd Ed., pages 65–66.

The sulfides of this embodiment of the invention are preferably alkyl sulfides having one or more of the following sulfide groups:

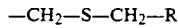

wherein R is alkyl, for example lower alkyl of from 1 to 11 carbon atoms and preferably lower alkyls of from 7 to 11 carbon atoms, such as heptyl, octyl, nonyl, decyl, and undecyl; and branched chain lower alkyls of from 3 to 11 carbon atoms such as such tert-butyl, 2,2-dimethylpropyl, 1-methylpropyl, sec-propyl, 1,2,2-trimethylpropyl, 2-methylpropyl, 1,2-dimethyl-2-ethylbutyl, and the like. An example of a sulfide is pentaerythritol tetrakis ($\beta$-laurylthiopropionate).

A surfactant may be included with the stabilizer to provide an emulsion of the stabilizer. Examples of surfactants suitable for use with the stabilizers of the invention are those which are thermally stable over 200° C.–350° C. Most preferably, sodium dodecylbenzene sulfonate is employed as the surfactant. The amount of surfactant typically constitutes 5 to 25% (by weight) of the stabilizer emulsion depending on the specific properties of the surfactant.

The term "polymeric additives", as used herein, means a polymeric composition that is useful as an additive to other polymeric compositions. The polymeric additives of the invention may be prepared by various methods such as by forming a stabilizer mixture of: sterically hindered phenol(s) of formula (I) or (III) above, less sterically hindered phenol(s) of formula (II) or (IV) above, and sulfide, and adding that stabilizer mixture to a polymer to provide a stabilized polymeric additive.

A variety of polymers may be treated with the stabilizers of the invention to provide polymeric additives. For example, polymers such as acrylonitrile-butadiene-styrene, styrene-butadiene-styrene block copolymers, styrene-isoprene-styrene, acrylate, methacrylate, styrene with an acrylate, styrene with a methacrylate, a styrene derivative with an acrylate, a styrene derivative with a methacrylate, or maleate, or fumarate, or maleate and fumarate, an olefin copolymer with an acrylate, an olefin copolymer with a methacrylate or maleic anhydride followed by functionalization of the anhydride, and the like may be treated with the stabilizers of this invention to provide polymeric additives. In particular, MBS and AIMS polymers may be treated with the stabilizers of the invention to provide polymeric additives. These MBS and AIMS polymeric additives have been found to impart surprisingly improved physical and mechanical properties to polymer matrices such as acrylics and nylons.

AIMS polymers (acrylic impact modifiers) refer to (meth)acrylic polymers. MBS polymers refer to methacrylate/butadiene/styrene polymers, especially those of core/shell structure. In the present application, MBS is also used to refer to polymers containing butadiene/alkyl acrylate/alkyl methacrylate, butadiene/alkyl acrylate/alkyl methacrylate/styrene, styrene/copolymerized acid, and the like. Illustrative of such polymers would be butadiene/butyl acrylate//methyl methacrylate, butadiene/butyl acrylate/styrene//styrene//methyl methacrylate, butadiene/ethyl acrylate//methyl methacrylate/methacrylic acid, and the like.

The types of MBS and AIMS polymers which are useful as polymeric additives, in polymeric matrices such as acrylics and nylons, are of the core/shell type. Core/shell type MBS polymers have a rubbery core of polymer that contains at least 50 weight percent butadiene, a second stage shell of either styrenic polymers, styrene/methacrylate polymers, or alkyl methacrylate polymers, and an optional third stage shell of either styrenic polymers, styrene/methacrylate polymers, or alkyl methacrylate polymers, with the qualification that the compositions of the second and third shells are not identical. The second and third stage shells also may be cross-linked. Core/shell type AIMS polymers have a rubbery core of polymer that contains at least 50 weight percent of an alkyl acrylate or methacrylate polymer or copolymer and one or more outer stages, shells, or layers of (meth)acrylic and other vinyl monomer polymers or copolymers. The core and outer shells may be crosslinked and graftlinked.

In the case of amide polymers collectively known as nylons, such as polycaprolactam and poly(hexamethylene adipamide), and the like, impact strength may be improved by reacting an acid or anhydride functionality on the impact-property modifier with an amine group available on the polyamide. Such functionalized modifiers include acrylic rubber//methyl methacrylate-co-unsaturated acid core-shell polymers as taught in U.S. Pat. No. 3,668,274. Preferred are those core-shell modifiers prepared in an emulsion, such as butadiene//styrene/acrylonitrile (ABS) and butadiene-styrene//styrene//methyl methacrylate (MBS), and butyl acrylate//methyl methacrylate, and those modifiers having reactive acid functionality. Also useful are acrylic impact modifier polymers having: 1) a rubbery core of alkyl acrylate, and one or more shells of either styrenic polymers, styrene-(meth)acrylate copolymers, or alkyl methacrylate polymers, or 2) a non-elastic, hard first stage of alkyl methacrylate, and one or more shells of either styrenic polymers, styrene-(meth)acrylate copolymers, or alkyl (meth)acrylate polymers and copolymers, of which are exemplified in U.S. Pat. Nos. 3,808,180 and 3,985,704. A preferred embodiment of the present invention is the use of such additive polymers to improve the impact resistance of nylons; it is especially useful with, but not limited to, the improvement of impact resistance in polycaprolactam and poly(hexamethylene adipamide), using polymers such as acid-functionalized core-shell polymers described above.

The impact-property modifier may also contain another polymer component such as described in European Patent Application No. 87307578.2, which is a copolymer of about 50 to about 95 parts of an alkyl acrylate or alkyl methacrylate having from 1 to 8 carbon atoms in the alkyl group, and with from about 5 to about 50 parts of an unsaturated copolymerizable carboxylic acid. It may also further contain a polymer predominantly of methyl methacrylate with little or no copolymerized carboxylic acid. The polymer additive is prepared by incorporating the stabilizer in one or more polymers such as acrylate, methacrylate, styrene with an acrylate, styrene with a methacrylate, a styrene derivative with an acrylate, a styrene derivative with a methacrylate, or maleate, or fumarate, or maleate and fumarate, an olefin copolymer with an acrylate, an olefin copolymer with a methacrylate or maleic anhydride followed by functionalization of the anhydride.

The total amount of stabilizers may vary from about 1.0 to about 3.0 percent by weight of the MBS or AIMS polymer. For a 2% loading (by weight percent) of the stabilizer, octadecyl 3,5-di-tert-butyl-4-hydroxyhydrocinnamate (hereinafter called "P1") can be from about 0.1 to about 0.8 weight %, ethylene bis(oxyethylene) bis(3-tert-butyl-4-hydroxy-5-methylhydrocinnamate) (hereinafter called "P2") can be from about 0.2 to about 1.4 weight %, and pentaerythritol tetrakis ($\beta$-laurylthiopropionate) (hereinafter called "S") can be from about 0.3 to about 1.6 weight %, all based on weight of the MBS or AIMS polymer. [See Table 3].

The polymeric additives that are produced by treatment with the stabilizers of the invention can be readily employed in a wide variety of polymer matrices to provide polymer products which have improved physical and mechanical properties, such as improved resistance to thermal and oxidative degradation. The polymeric additives can be included in nylon polymers such as poly(hexamethylene adipamide) and related polyamides, poly(p-phenylene sulfides), polysulfones, polyarylates, polystyrene, poly(ether imides), polyimides, poly(glutarimides), poly(phenylene ethers), aromatic polyesters such as poly(ethylene terephthalate), poly(butylene terephthalate), polycarbonates, and the like or mixtures thereof. Especially preferred are polycarbonates of bisphenol A. Generally, the additive is blended with the polymeric matrix which is then molded to form a polymer product that has improved physical and mechanical properties.

Analogous to acrylic and nylon matrices, the MBS and AIMS polymeric additives of the invention can be incorporated into other polymer matrices such as those polymers of aromatic polyesters such as poly(ethylene terephthalate), poly(butylene terephthalate) and the like, nylon polymers such as poly(hexamethylene adipamide) and related polyamides, poly(p-phenylene sulfides), polysulfones, polyarylates, polystyrene, poly(ether imides), polyimides, poly(glutarimides), poly(phenylene ethers), as well as various combinations and blends of these.

Polymeric additives, matrices and blends thereof may contain other components which are well known in the art such as toners, lubricants, anti-oxidants, colorants, ultraviolet stabilizers, hindered amine light stabilizers, impact modifiers, pigments, fillers, fibers, flame retardants, and the like.

The polymeric products which incorporate the polymeric additives of the invention and polymer matices may be formed, as for example, by injection molding or extruding, into a variety of useful objects and articles such as transportation and automotive parts, computer housings, electrical and electronic parts, telecommunication parts, industrial machine parts, consumer products, power tool housings, food packaging, wire and cable jacketing, filaments, appliance handles and housings, tough films, and the like.

Examples of transportation parts include but are not limited to electrical connectors, wire jackets, emission canisters, light-duty gears for windshield wipers, speedometers, engine fans, radiator headers, brake and power-steering fluid reservoirs, valve covers, mirror housing, and fender extensions. Examples of electrical or electronic parts include but are not limited to plugs, connectors, coil forms, wiring devices, terminal block, and antenna-mounting devices. Examples of telecommunication parts include but are not limited to relays, fittings, and contact makers. Examples of industrial machine parts include but are not limited to hammer handles, moving machine parts, unlubricated gears, bearings, anti-friction parts, and a variety of uses in which snap fits, detents, or spring loading is required. Food and textile-processing equipment, pumps, valves, meters, agricultural and printing devices, business and vending machines, and a host of other industrial products all utilize nylons. Examples of consumer products include but are not limited to ski boots, ice and roller skate supports, racquet sports equipment, and bicycle wheels, kitchen utensils, toys, and photographic equipment, as well as in a variety of other consumer applications. Examples of food packaging film uses include but are not limited to packaging for meats and cheese and cooling and heating bags and pouches. Examples of filaments include but are not limited to brush bristles, fishing line, sewing thread and filter screens. These polymeric products are also useful for producing blow-molded articles such as bottles, fuel tanks, automotive bumpers, and the like. Other uses for these polymeric products include but are not limited to heat resistant and solvent resistant engineering thermoplastics, medical devices, and electrical insulators. They may be formed into sheet, film, rod, profile, molded, coextruded, or complex parts by any known plastics processing technique, and can be painted, dyed, decorated, metallized, or coated with abrasion resistant coatings and the like.

While the invention has been described and exemplified in great detail, alternative embodiments, examples, alterations and improvements should become apparent without departure from the spirit and scope of the invention.

It is believed that one skilled in the art can, using the preceding description, utilize the present invention to its fullest extent. The following preferred specific embodiments are, therefore, to be construed as merely illustrative, and not limitative of the disclosure in any way. In the following examples, all temperatures are set forth in degrees Celsius and all parts and percentages are by weight, unless otherwise indicated.

EXAMPLE 1

Preparation of Polymeric Additive

Step 1A. Preparation of Rubbery Polymer Latex

A stainless steel autoclave with an agitator and several entry ports was charged with a mixture of 3.4 parts of acetic acid in 6700 parts of deionized water; 499 grams of a butadiene/styrene copolymer having a composition of approximately 70% butadiene and 30% styrene, and having a particle size of 70 um; and 24 parts of sodium formaldehyde sulfoxylate. The autoclave was then evacuated and 6000 parts butadiene, 2000 parts butyl acrylate, 132 parts of sodium dodecyl sulfonate in 1092 parts of water, and 72 parts of tertiary butyl hydroperoxide were added, and heated to 80°–85° C. for a period of 8 hours. At the end of the reaction period, no further pressure drop was observed. The residual pressure was vented and the latex was strained to remove gum.

Step 1B. Preparation of a Graft Polymer 11813 parts of the latex prepared in step A was heated to 80° C. 4.1 parts of sodium formaldehyde sulfoxylate was dissolved in 238 parts of deionized water and then added to the 80° C. latex. While maintaining the temperature at 80° C., 1326 parts of methylmethacrylate, 102 parts of acryloxy propionic acid, 68 parts of butyl acrylate, 2.7 parts of sodium dodecyl sulfonate in 1486 parts deionized water, and 6.8 parts tertiary butyl hydroperoxide were added, and held at 80° C. for one hour. To complete the reaction, an additional 2 parts sodium formaldehyde in 102 parts deionized water, and 3.4 parts tertiary butyl hydroperoxide were added.

Step 2A. Preparation of the Stabilizer Package 10 grams of octadecyl 3,5-di-tert-butyl-4-hydroxyhydrocinnomate (hereinafter designated as P1), 10 grams of ethylene bis(oxyethylene) bis(3-tert-butyl-4-hydroxy-5-methylhydrocinnomate (hereinafter designated as P2), and 30 grams of pentaerythritol tetrakis (β-laurylthiopropionate) (hereinafter designated as S) were charged to a reaction vessal while heating to 70° C. When the mixture began to melt (55°–60° C.), it was vigorously agitated to yield a homogeneous melt. 40.6 grams of sodium dodecyl benzene sulfonate were charged as a 25% active aqueous solution. The emulsion was agitated for 5 minutes, and 9.4 grams of deionized water was added to the emulsion. After an additional 20 minutes of mixing, the emulsion of the stabilizer component was used for preparing the stabilized polymer additive as described in step 2B below.

Step 2B. Preparation of Stabilized Polymeric Additive

Sixteen grams of the stabilizer component emulsion formed in Step 2A, was added to 1000 grams of the 40% solid polymeric additive latex, synthesized in Step 1. The resulting stabilized polymeric additive was agitated for 20 minutes at 60° C., and then cooled to less than 40° C. The emulsion was isolated by freeze drying, and can also be isolated by salt coagulation or spray drying, to provide a polymeric additive which contains 2% stabilizer.

EXAMPLE 2

Comparison of Thermal Gravimetric Analysis of Neat Modifier Stabilizer Packages in a Polymeric Additive

TABLE 2

| THERMAL GRAVIMETRIC ANALYSIS (TGA) OF POLYMERIC ADDITIVE | |
|---|---|
| Polymeric Additive (Package) | TGA in air, 550° F., Time to 10% Wt. Loss |
| A) Unstabilized | 10 seconds |
| B) P1/P2/S 0.8/0/1.2 | 36 seconds |
| C) P1/P2/S 0/0.8/1.2 | 6.8 minutes |
| D) P1/P2/S 0.4/0.4/1.2 | 28.3 minutes |

Comparison of the TGAs of Stabilizer Packages in Polymeric Additives C and D in air at 550° F. (vs. Stabilizer Packages in Polymeric Additives A and D) confirm that there is an unexpected effect caused by the addition of both P1 and P2.

EXAMPLE 3

Comparison of DSC Values of Stabilized Polymeric Additives

The polymer products are prepared by compounding a polymeric matrix with a stabilized polymeric additive on an American Leistritz twin screw extruder. Other extruders of various sizes can be used and will afford similar results. (The barrel temperature settings for zones 2-5 were respectively 245°, 255°, 260°, 265° C.; the die temperature was 265° C.; the melt temperature was 317°–326° C.; the gauge (vacuum) pressure was 29 in.; the amps were 13–17; and the screw speed was 120 revolutions per minute).

The polymer products were molded in a Newbury injection molder. Other molders of various sizes can be used and will afford similar results. During molding, the temperature settings for the feed was 260° C., the compression was 266° C., the metering was 268° C., and the nozzle was 271° C. The stationary and moveable mold temperatures were 107° C. The injection time was 5 seconds; and the injection forward cycle time and cure cycle time were 20 seconds. The injection pressure was 500 psi (pounds per square inch), and the back pressure was 100 psi. Screw speed was 100 revolutions per minute).

The ratios of the three stabilizer components were varied in the polymeric additive. The stabilizer loading was kept constant at 2%, and DSC values were obtained for variations of the ratios of components found in Stabilizer Package D (see Table 3).

TABLE 3

RATIO VARIATIONS OF STABILIZER COMPONENTS IN POLYMERIC ADDITIVE (2% LOADING)

| Polymeric Additive (Blend No.) | S | P1 | P2 | DSC. 190° C. |
|---|---|---|---|---|
| 1 | 1.3 | 0.4 | 0.3 | 118 min. |
| 2 | 0.3 | 1.3 | 0.4 | 76 |
| 3 | 0.4 | 0.3 | 1.3 | 16 |
| 4 | 1.3 | 0.3 | 0.4 | >120 min. |
| 5 | 0.3 | 0.4 | 1.3 | 68 |
| 6 | 0.4 | 1.3 | 0.3 | 53 |
| 7 | 0.67 | 0.67 | 0.66 | 120 min. |
| 8 | 1.45 | 0.15 | 0.4 | >120 min. |
| 9 (Package D) | 1.2 | 0.4 | 0.4 | >120 min. |

Varying the ratio of the components when the total stabilizer loading was 2%, demonstrated improved thermal stability occurred when at least 0.67% of S was used. When less than 0.67% S was used (e.g. 0.3, 0.4), thermal stability dropped sharply.

EXAMPLE 4

High Temperature Molding

Effectiveness of the stabilizer packages in stabilized additive/nylon blends was tested for processing stability at high temperature molding conditions. All blends remained fully ductile under the Notched Izod Impact Test (ASTM D-256), when molded under standard conditions (260°–266°–268°–271° C.). However, at higher molding conditions (temperatures) of 321°–327°–332°–338° C., only blends 4, 6, and 9 retained 100% ductility (see Table 4).

TABLE 4

Comparison of ⅛" Notched Izod 23° of Blends Molded at Standard and High Temperature Conditions

| Blend** | Standard Temperature Molding (ft.-lbs/in.)* | High Temperature Molding (ft.-lbs/in.) (% ductility) |
|---|---|---|
| 1 | 12 ± 0.2 | 10 ± 4.6 (66%) |
| 2 | 11 ± 0.6 | 9 ± 3.8 (66%) |
| 3 | 10 ± 0.2 | 9 ± 4.0 (66%) |
| 4 | 12 ± 0.8 | 11 ± 1.3 (100%) |
| 5 | 11 ± 0.6 | 9 ± 3.3 (66%) |
| 6 | 10 ± 0.1 | 12 ± 1.1 (100%) |
| 7 | 11 ± 0.4 | 11 ± 3.0 (66%) |
| 8 | 10 ± 0.5 | 7 ± 1.0 (66%) |
| 9 (Package D) | 13 ± 0.5 | 12 ± 0.6 (100%) |

Standard Molding Condition: 260-266-268-271° C.
High Temperature Molding Conditions: 321-327-332-338° C.
*All samples molded at standard conditions were fully ductile
**See Table 3 for the ratio of components of Blends 1-9.

EXAMPLE 5

Effect of Heat Aging on Stabilized Polymers

The polymeric products containing stabilized polymeric additives were evaluated for retention of properties after heat aging. Izod bars and plaques were placed on a carousel in a forced air oven for 24 hours at 150° C. Samples were removed at designated intervals and tested for impact strength.

TABLE 5

⅛" Notched Izod. (ft.-lbs./in.) 23° C.
(Stabilizer Study - Oven Aging at 150° C.)

| Blend | 0 Hrs | 4 Hrs | 8 Hrs | 16 Hrs | 20 Hrs | 24 Hrs |
|---|---|---|---|---|---|---|
| | (Unaged Control) | | | | | |
| 1 | 12 | 8 | 10 | 6 | 6 | 9 |
| | (100) | (25) | (100) | (0) | (0) | (100) |
| 2 | 11 | 10 | 10 | 11 | 10 | 10 |
| | (100) | (100) | (100) | (100) | (100) | (100) |
| 3* | 10 | 10 | 11 | 9 | 7 | 5 |
| | (100) | (100) | (100) | (100) | (50) | (0) |
| 4 | 12 | 9 | 8 | 10 | 9 | 10 |
| | (100) | (100) | (75) | (100) | (100) | (100) |
| 5 | 11 | 9 | 9 | 10 | 10 | 10 |
| | (100) | (100) | (100) | (100) | (100) | (100) |
| 6* | 10 | 10 | 8 | 8 | 7 | 5 |
| | (100) | (100) | (75) | (50) | (75) | (0) |
| 7 | 11 | 11 | 11 | 10 | 9 | 9 |
| | (100) | (100) | (100) | (100) | (100) | (100) |
| 8 | 10 | 9 | 9 | no data | no data | 9 |
| | (100) | (100) | (100) | | | (100) |
| 9 | 13 | 10 | 9 | 9 | 10 | 10 |
| | (100) | (100) | (100) | (100) | (100) | (100) |

2% Stabilizer Loading
American Leistritz Extrusion: 245-255-260-265-265° C.
Molding: 260-217° C.
( ) = % ductility
* = became brittle

EXAMPLE 6

Yellowness Index

The plaques from the heat aging were evaluated for yellowness index (according to ASTM D-1925). The Notched Izod Test was conducted according to ASTM D-256. After 24 hrs., Blend 9 (Package D) experienced the least amount of color change of all the variants.

TABLE 6

Yellowness Index of Heat Aged Plaques

| Blend | 0 hrs. | 4 hrs. | 8 hr. | 16 hrs. | 20 hrs. | 24 hrs. |
|---|---|---|---|---|---|---|
| 1 | 15.79 | 30.07 | 39.60 | 66.65 | 72.10 | 73.84 |
| 2 | 17.51 | 31.23 | 48.91 | 66.41 | 70.99 | 73.15 |
| 3 | 19.13 | 48.46 | 53.26 | 79.63 | 84.74 | 89.15 |
| 4 | 19.16 | 29.71 | 39.43 | 54.29 | 59.70 | 59.06 |
| 5 | 19.92 | 30.70 | 38.37 | 64.08 | 17.21 | 71.04 |
| 6 | 19.71 | 32.53 | 39.94 | 61.05 | 74.51 | 67.23 |
| 7 | 19.35 | 28.34 | 36.77 | 61.92 | 71.10 | 71.35 |
| 8 | | | no data | | | |
| 9* | 23.54 | 31.27 | 36.07 | 49.68 | 50.64 | 51.47 |

(* = Package D)

EXAMPLE 7

Determination of Effective Stabilizer Level

After determining that Package D (P2/P1/S-0.4/0.4/1.2) imparted the best thermal stability, stabilizer loading was varied from 1 to 3%, and the ratio of components in Package D (P2/P1/S) were kept the same. DSC testing of the neat modifier was conducted, and 1.0% and 1.5% loadings did not significantly improve thermal stability, while 2.0% loading greatly improved thermal stability. Greater stability was also achieved at 2.5% and 3.0% loadings (see Table 7).

TABLE 7

DSC of Stabilized Polymeric Additive

| Stabilizer Loading | DSC, 190° max peak |
|---|---|
| 0% | 1 min. |
| 1% | 5 min. |
| 1.5% | 8 min. |
| 2.0% | 110 min. |

TABLE 7-continued

| DSC of Stabilized Polymeric Additive | |
|---|---|
| Stabilizer Loading | DSC, 190° max peak |
| 2.5% | >120 min. |
| 3.0% | >120 min. |

Stabilizer loading of 2% is preferred and found to be the most cost effective.

What is claimed is:

1. A stabilizer composition comprising: 1) a sulfide having one or more of the following sulfide groups:

wherein R is lower alkyl, alkyl alkanoate, or 2,4-bis(n-octylthiol)-6-(4'-hydroxy-3',5'-di-tert-butylanilino)-1,3,5-triazine; 2) a sterically hindered phenol of the formula (III):

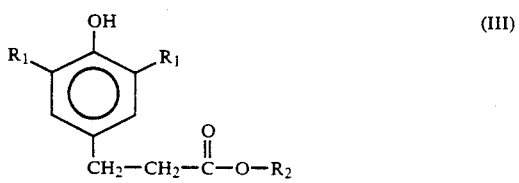

wherein $R_1$ is a branched chain alkyl, and $R_2$ is an alkyl of at least four carbon atoms; and 3) a less sterically hindered phenol of the formula (IV):

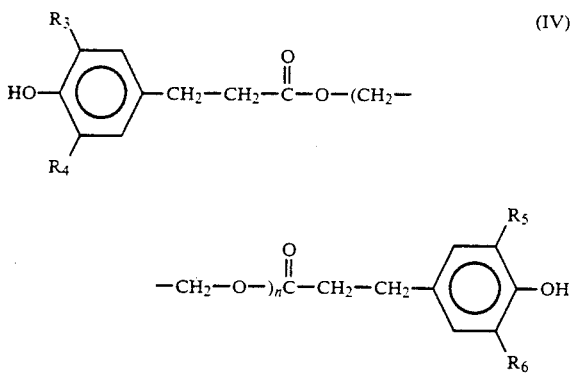

wherein n is an integer of from 1 to 10, $R_3$ and $R_5$ are hydrogen or lower alkyl, and $R_4$ and $R_6$ are branched chain alkyl.

2. The composition of claim 1 wherein the sterically hindered phenol comprises from about 5 to about 40% parts by weight, the less sterically hindered phenol comprises from about 10 to about 70% parts by weight, and the alkyl sulfide comprises from about 15 to about 80% parts by weight.

3. The composition of claim 2 wherein the sterically hindered phenol comprises from about 8 to about 33% parts by weight, the less sterically hindered phenol comprises from about 15 to about 33% parts by weight and the alkyl sulfide comprises from about 33 to about 73% parts by weight.

4. The composition of claim 2 wherein $R_1$ of the sterically hindered phenol is a branched lower alkyl; $R_2$ of the sterically hindered phenol is a $C_4$–$C_{30}$ alkyl; $R_4$ and $R_6$ of the less sterically hindered phenol are branched chain alkyls; and $R_3$ and $R_5$ of the less sterically hindered phenol are hydrogen or a lower alkyl; and the sulfide is selected from pentaerythritol tetrakis ($\beta$-laurylthiopropionate), dilaurylthiodiproprionate, pentaerythritol tetrakis (octyl thiopropionate), distearyl thiodipropionate, dimyristyl thiodipropionate, 2,4-bis (n-octylthio)-6-(4'-hydroxy-3',5'-di-tert-butylanilino)-1,3,5-triazine, trimethylolpropane tris(octylthiopropionate), trimethylolethane tris(octylthiopropionate), ethylene glycol bis(laurylthiopropionate), and didodecylmonosulfide.

5. The composition of claim 2 comprising octadecyl 3,5-di-tert-butyl-4-hydroxyhydrocinnamate, ethylene bis(oxyethylene) bis(3-tert-butyl-4-hydroxy-5-methylhydrocinnamate), and pentaerythritol tetrakis ($\beta$-laurylthiopropionate).

6. The composition of claim 5 comprising from about 8 to about 33% parts by weight of octadecyl 3,5-di-tert-butyl-4-hydroxyhydrocinnamate, from about 15 to about 33% parts by weight of ethylene bis(oxyethylene) bis(3-tert-butyl-4-hydroxy-5-methylhydrocinnamate), and from about 33 to about 73% parts by weight of pentaerythritol tetrakis ($\beta$-laurylthiopropionate).

7. The composition of claim 6 comprising about 20% parts by weight of octadecyl 3,5-di-tert-butyl-4-hydroxyhydrocinnamate, about 20% parts by weight of ethylene bis(oxyethylene) bis(3-tert-butyl-4-hydroxy-5-methylhydrocinnamate), and about 60% parts by weight of pentaerythritol tetrakis ($\beta$-laurylthiopropionate).

8. A polymer additive that has improved resistance to thermal and oxidative degradation, comprising a polymer and the stabilizer composition of claim 1.

9. The polymer additive of claim 8 wherein the polymer is selected from one or more acrylate, methacrylate, styrene with an acrylate, styrene with a methacrylate, a styrene derivative with acrylate, a styrene derivative with methacrylate, or maleate, or fumarate, or maleate and fumarate, an olefin copolymer with acrylate, an olefin copolymer with methacrylate or maleic anhydride or aromatic polyester, or mixtures thereof.

10. The polymer additive of claim 9 wherein the polymer is MBS, the sterically hindered phenol is octadecyl 3,5-di-tert-butyl-4-hydroxyhydrocinnamate, the sulfide is pentaerythritol tetrakis ($\beta$-laurylthiopropionate), and the less sterically hindered phenol is ethylene bis(oxyethylene) bis(3-tert-butyl-4-hydroxy-5-methylhydrocinnamate).

11. The polymer additive of claim 9 wherein the polymer is AIMS, the sterically hindered phenol is octadecyl 3,5-di-tert-butyl-4-hydroxyhydrocinnamate, the sulfide is pentaerythritol tetrakis ($\beta$-laurylthiopropionate) and the less sterically hindered phenol is ethylene bis(oxyethylene) bis(3-tert-butyl-4-hydroxy-5-methylhydrocinnamate).

12. The polymer additive of claims 10 or 11 wherein the octadecyl 3,5-di-tert-butyl-4-hydroxyhydrocinnamate is from about 5 to about 40% of composition, the sulfide is from about 15 to about 80% of the composition, and the less sterically hindered phenol is from about 10 to about 70% of the composition.

13. The polymer additive of claim 8 wherein the stabilizer composition is from about 1.0 to about 3.0 percent of the polymer.

14. The polymer additive of claims 10 or 11 wherein the stabilizer composition is from about 1.0 to about 3.0 percent of the polymer.

15. A polymer product, comprising a polymer matrix and the polymer additive of claim 8.

16. The polymer product of claim 15 wherein the polymer matrix is an aromatic polyester, poly(ethylene terephthalate), poly(butylene terephthalate), nylon polymers, poly(hexamethylene adipamide), poly(p-phenylene sulfides), polysulfones, polyarylates, polystyrene, poly(ether imides), polyimides, poly(glutarimides), poly(phenylene ethers), polycarbonates, or mixtures thereof.

17. An article from the polymer product of claim 15.

18. The article of claim 17 in the form of transportation and automative parts, computer housings, appliance handles and housings, electrical and electronic parts, telecommunication parts, industrial machine parts, consumer products, power tool housings, food packaging, wire and cable jacketing, filaments, tough films, bottles, fuel tanks, automotive bumpers, medical devices, and sheet, film, rod, profile or molded parts.

19. The stabilizer composition of claim 1 wherein R is lower alkyl of from 7 to 11 carbon atoms.

20. A stabilizer composition comprising: 1) a sulfide having one or more of the following sulfide groups:

$$-CH_2-S-CH_2-R$$

wherein R is lower alkyl, alkyl alkanoate, or 2,4-bis(n-octylthiol)-6-(4'-hydroxy-3',5'-di-tert-butylanilino)-1,3,5-triazine; 2) a sterically hindered phenol selected from hexamethylene bis (3,5-di-tert-butyl-4-hydroxy hydrocinnamate) or 2,2-[[3-[3,5-bis(1,1-dimethylethyl)-4-hydroxyphenyl]-1-oxopropoxy] methyl]-1,3-propanediyl 3,5-bis(1,1-dimethyl)-4-hydroxybenzenepropanoate; and 3) a less sterically hindered phenol consisting of octadecyl 3-methyl, 5-t-butyl-4-hydroxy hydrocinnamate.

* * * * *

UNITED STATES PATENT AND TRADEMARK OFFICE
CERTIFICATE OF CORRECTION

PATENT NO. : 5,164,434

DATED : November 17, 1992

INVENTOR(S) : Susan M. Liwak and Nazir A. Memon

It is certified that error appears in the above-identified patent and that said Letters Patent is hereby corrected as shown below:

Title page, item [57]

<u>In the Abstract</u>

Line 2 delete --three-- and add "these"

Col. 1, line 54 delete --styrene-butadiene-styrene--. (2nd occurrence).

Col. 4, line 59 after $\beta$ insert "-laurylthiopropionate),"

Col. 13, Claim 1, line 13, add the structure "$-CH_2-S-CH_2-R$"

Col. 16, Claim 20, line 12 insert "bis" between 2,2- and [[3-

Signed and Sealed this

Nineteenth Day of October, 1993

Attest:

BRUCE LEHMAN

*Attesting Officer*     *Commissioner of Patents and Trademarks*